Jan. 3, 1950
T. K. CROSSLAND
2,493,227
COASTER BRAKE
Filed Dec. 31, 1946
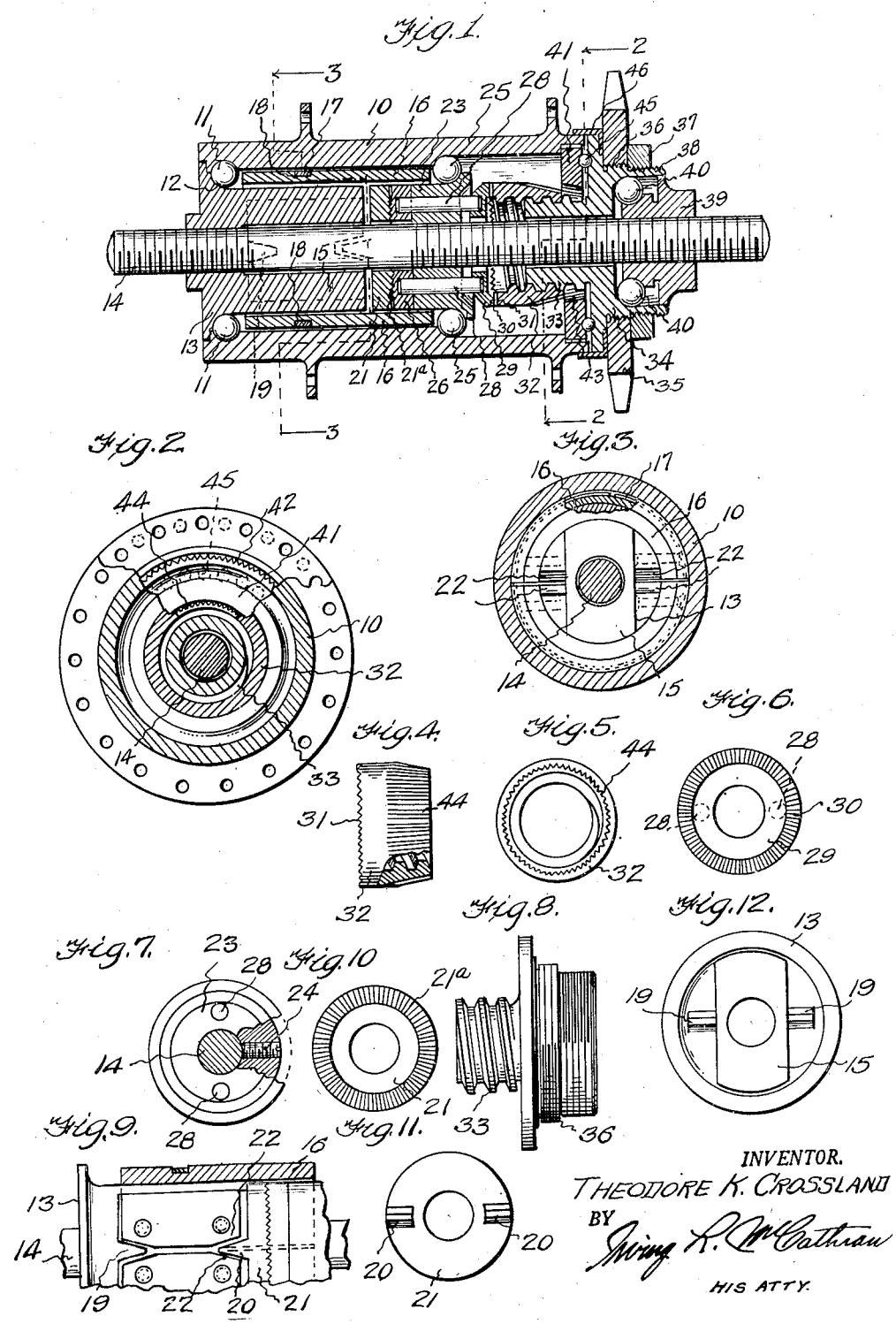
INVENTOR.
THEODORE K. CROSSLAND
BY
*Irving R. McCathran*
HIS ATTY.

Patented Jan. 3, 1950

2,493,227

UNITED STATES PATENT OFFICE 2,493,227

COASTER BRAKE

Theodore K. Crossland, Hialeah, Fla.

Application December 31, 1946, Serial No. 719,490

5 Claims. (Cl. 192—6)

This invention relates to a coaster brake, and has for one of its objects the production of a simple and efficient coaster brake wherein the bearings which support the hub ride on bearing races or cones which are in direct contact with the axle.

A further object of this invention is the production of a simple and efficient coaster brake having a magnetized clutch for holding the clutch while the operator moves it into a locking position.

Other objects and advantages of the present invention will appear throughout the following specification and claims.

In the drawing:

Figure 1 is a longitudinal sectional view through the coaster brake;

Figure 2 is an irregular sectional view taken on line 2—2 of Figure 1;

Figure 3 is an irregular sectional view taken on line 3—3 of Figure 1;

Figure 4 is a side elevational view of the worm-nut of the clutch, partly shown in section;

Figure 5 is an end view of the worm-nut shown in Figure 4;

Figure 6 is an end view of the serrated or clutch-disc which is adapted to engage the worm-nut or clutch member;

Figure 7 is an end view of the bearing cone partly in section, the shaft or axle also being shown in section;

Figure 8 is a side elevational view of the drive worm and sprocket hub;

Figure 9 is a longitudinal sectional view through one of the brake shoes;

Figure 10 is a plan view showing the serrated face of the brake wedge-disc;

Figure 11 is a plan view illustrating the wedge-carrying face of the brake wedge-disc;

Figure 12 is an end view of the brake shoe-supporting member.

By referring to the drawing, it will be seen that 10 designates the wheel hub or spool which is rotatably supported at one end upon the ball bearings 11, which ball bearings are carried by the race 12 of the fixed brake shoe-supporting member 13. The hub 10, ball bearings 11, and race 12 constitute one bearing unit. The member 13 is preferably threaded upon the shaft of axle 14, as shown in Figure 1. The member 13 is provided with an inwardly extending core 15 which is substantially rectangular in its transverse area as shown in Figure 3. A pair of brake shoes 16 are carried by the core 15 and are adapted to expand radially of the member 13. A split spring band 17 fitting in the channels 18 of the shoes 16 holds the shoes normally contracted. The member 13 is provided with a wedge-shaped lug 19 upon each side of the core 15 for contacting the shoes 16 and causing the shoes 16 to expand as the wedge-shaped lugs 20 of the brake wedge-disc 21 engage the beveled faces 22 of the brake shoes 16. The disc 21 is slidable toward and away from the shoes 16 to move the lugs 20 into and out of a brake shoe actuating position, to move the shoes into engagement with the inner face of the hub or spool 10, as will be obvious by considering Figure 9. The opposite face of the disc 21 is serrated, as at 21ª.

A bearing cone 23 is fixed on the shaft or axle 14 by being threaded thereon and locked by a set screw 24. The cone 23 supports the ball bearings 25 which in turn rotatably support the hub 10 near the opposite end relative to the ball bearings 11 above mentioned. The cone 23, ball bearings 25 and the hub constitute a second bearing unit. A serrated disc 26 having serrated teeth 27 on the face adjacent the serrated face 21ª of the disc 21 is slidable on the shaft or axle 14 and is carried by the inner ends of the pins 28 which pins are slidable through the bearing cone 23. The opposite ends of the pins 28 are secured to the clutch-disc 29. The disc 29 is provided with a serrated face 30, which face 30 is adapted to be contacted by the serrated face 31 of the worm-nut or clutch member 32.

The worm-nut or clutch member 32 is threaded upon the worm-thread 33 carried by the hub extension of the sprocket hub 34. This worm-nut or clutch member 32 is magnetized and thereby eliminates the conventional spring. The magnetism will hold the clutch member 32 while the operator is moving the clutch member 32 into a locking position and prevent the clutch member from merely rotating with the hub extension. A sprocket 35 is threaded upon the right-hand thread 36 of the sprocket hub 34 and is locked in position by means of the lock nut 37 which is threaded upon the left-hand thread 38 of the sprocket hub 34. An adjusting nut 39 of the conventional type is threaded upon the shaft or axle 14 and carries ball bearings 40 which engage the sprocket hub 34, as shown in Figure 1.

A drive washer or ring 41 is fitted in one end of the hub 10 adjacent the sprocket hub 34 and is provided with serrated teeth 42 for gripping the hub 10, as shown in Figures 1 and 2. The ring 41 is provided with a central tapering aperture 43 for receiving the inclined serrated face 44 of the magnetized worm-nut or clutch member 32. Ball bearings 45 are interposed between the ring 41 and the sprocket hub 34, as shown in Figure 1. A shielding band or shroud 46 overlies the space between the ring 41 and hub 34.

As the sprocket wheel 35 is driven in a forward direction, the worm-nut or clutch member 32 will be drawn into clutching engagement with the wall of the tapering aperture 43 and thereby transmit a forward driving motion to the hub 10 through the ring 41. When the direction of rotation of the sprocket wheel 35 is reversed the nut or clutch member 32 will be moved into clutching engagement with the disc 26, and this disc 26 will be moved longitudinally of the shaft or axle 14 thereby shifting the pins 28 longitudinally and moving the disc 21 and wedges 20 into contact with the brake bands 16. Continual reverse pressure upon the sprocket wheel 35 will spread the bands 16 into gripping action with the inner face of the hub 10 thereby applying a braking action thereon in proportion to the reverse pressure applied to the wheel 35.

It should be understood that certain detail changes in the mechanical construction may be employed without departing from the spirit of the invention, so long as such changes fall within the scope of the appended claims.

Having described the invention, what is claimed is:

1. A coaster brake of the class described comprising a fixed axle, a hub, a brake shoe-supporting member fixed to said axle, a bearing unit supporting one end of said hub upon said brake shoe-supporting member, brake shoes carried by said supporting member, a bearing cone fixed to said axle, a second bearing unit supporting said hub in spaced relation with respect to the first mentioned bearing unit and carried by said cone, a driving element engaging said hub, a clutch movable into engagement with said driving element when the driving element is driven in one direction for rotating said hub, means for selectively moving said clutch into and out of clutching engagement with the driving element, and means adapted to be engaged with said brake shoes for forcing said shoes into braking engagement with said hub when said driving element is rotated in an opposite direction.

2. A coaster brake of the class described comprising a fixed axle, a hub, a brake shoe-supporting member fixed to said axle, a bearing unit supporting one end of said hub upon said brake shoe-supporting member, brake shoes carried by said supporting member, a bearing cone fixed to said axle, a second bearing unit supporting said hub in spaced relation with respect to the first mentioned bearing unit and carried by said cone, a driving element engaging said hub, a clutch movable into engagement with said driving element when the driving element is driven in one direction for rotating said hub, means for selectively moving said clutch into and out of clutching engagement with the driving element, means adapted to be engaged with said brake shoes for forcing said shoes into braking engagement with said hub when said driving element is rotated in an opposite direction, said last mentioned means comprising a clutch-disc slidable on said axle and adapted to directly engage the clutch, pins carried by said clutch-disc passing through said cone, a serrated disc slidable on said axle and secured to the opposite ends of said pins and movable with said clutch-disc, a brake wedge-disc adapted to be engaged by the serrated disc for moving the wedge-disc into engagement with the brake shoes, and wedges carried by the wedge-disc for fitting between said shoes and expanding the shoes to move the shoes to a braking position.

3. A coaster brake of the class described comprising a fixed axle, a hub, a brake shoe-supporting member fixed to said axle, a bearing unit supporting one end of said hub upon said brake shoe-supporting member, brake shoes carried by said supporting member, a bearing cone fixed to said axle, a second bearing unit supporting said hub in spaced relation to said first mentioned bearing unit and carried by said cone, a driving element engaging said hub, a clutch movable into engagement with said driving element when the driving element is driven in one direction for rotating said hub, means for selectively moving said clutch into and out of clutching engagement with the driving element, means adapted to be engaged with said brake shoes for forcing said shoes into braking engagement with said hub when said driving element is rotated in an opposite direction, said last mentioned means comprising a clutch-disc slidable on said axle and adapted to directly engage the clutch, pins carried by said clutch-disc passing through said cone, a serrated disc slidable on said axle and secured to the opposite ends of said pins and movable with said clutch-disc, a brake wedge-disc movable into engagement with the brake shoes, wedges carried by the wedge-disc for fitting between said shoes and expanding the shoes to move the shoes to a braking position, and means encircling said brake shoes for retracting said shoes to a releasing position when pressure is relieved from said wedge-disc.

4. A coaster brake of the class described comprising a fixed axle, a rotating hub journalled thereon, a brake means carried within the hub, a driving sprocket journalled for rotation relative to the hub and axle, a drive ring fixed to the hub and having a clutch means, a threaded hub fixed to said sprocket, a magnetized clutch member carried by said threaded hub and movable into engagement with the clutch means of said ring when said sprocket is driven in a forward direction to rotate said hub and movable to a disengaging position when the sprocket is rotated in a reverse direction, and brake means actuated by said clutch member for engaging said hub and rendering the brake means active when the sprocket is rotated in a reverse direction.

5. A coaster brake of the class described comprising a fixed axle, a rotating hub journalled thereon, a brake means carried within the hub, a driving sprocket journalled for rotation relative to the hub and axle, a drive ring fixed to the hub and having a clutch means, a threaded hub fixed to said sprocket, a clutch member carried by said threaded hub and movable into engagement with the clutch means of said ring when said sprocket is driven in a forward direction to rotate said hub and movable to a disengaging position when the sprocket is rotated in a reverse direction, brake means actuated by said clutch member for engaging said hub and rendering the brake means active when the sprocket is rotated in a reverse direction, and a bearing cone journalled within the hub intermediate the ends thereof, the clutch means and clutch being located to one side of the cone and the brake means being located to the opposite side of the cone.

THEODORE K. CROSSLAND.

REFERENCES CITED

The following references are of record in the file of this patent:

UNITED STATES PATENTS

| Number | Name | Date |
|---|---|---|
| 1,018,471 | Zimmerman | Feb. 27, 1912 |
| 2,151,324 | Jordan | Mar. 21, 1939 |
| 2,291,486 | Musselman | July 28, 1942 |
| 2,361,239 | Ranson | Oct. 24, 1944 |